United States Patent [19]

Pearson

[11] 4,140,230
[45] Feb. 20, 1979

[54] POWERED LOADING PLATFORM

[76] Inventor: Marvin R. Pearson, 4407 Loretto La., Minnetonka, Minn. 55343

[21] Appl. No.: 796,399

[22] Filed: May 12, 1977

[51] Int. Cl.² .............................................. B60P 1/48
[52] U.S. Cl. .................................. 214/77 R; 182/223; 214/DIG. 13
[58] Field of Search ............... 214/77 R, 77 D, 75 R, 214/75 T, DIG. 13; 280/166; 182/91, 128, 141, 223; 14/69.5

[56] References Cited

U.S. PATENT DOCUMENTS

| | | | |
|---|---|---|---|
| 1,070,009 | 8/1913 | Brown | 182/223 |
| 3,182,826 | 5/1965 | Mutto | 214/75 R |
| 3,638,813 | 2/1972 | Strong | 214/77 R |
| 3,776,402 | 12/1973 | Bryan | 214/75 T |
| 3,826,386 | 7/1974 | Tauer | 214/77 R |
| 3,913,759 | 10/1975 | Deacon | 214/77 R |
| 3,994,365 | 11/1976 | Petermann et al. | 182/128 |
| 4,015,725 | 4/1977 | Ryan et al. | 214/DIG. 13 |
| 4,026,387 | 5/1977 | Abreu | 214/75 T |

Primary Examiner—Francis S. Husar
Assistant Examiner—Ross Weaver
Attorney, Agent, or Firm—Schroeder, Siegfried, Ryan, Vidas & Steffey

[57] ABSTRACT

A powered loading platform for mounting upon opening-defining walls of a vehicle to facilitate loading of objects, such as wheelchairs, from the ground into the interior of the vehicle and including support means which pivotally supports a horizontal platform and is carried by a powered parallelogram linkage which moves the support means in an arc between a lowered and outwardly disposed position upon the ground and an inwardly disposed elevated position within the body of the vehicle. Upon reaching the elevated position, the wheelchair may be rolled into the interior of the vehicle and the platform may be collapsed and then pivoted to a vertically extending position entirely within the confines of the vehicle. The support means is pivotable about a vertical axis to permit the collapsed platform to be then swung to non-blocking position relative to the vehicle opening.

20 Claims, 10 Drawing Figures

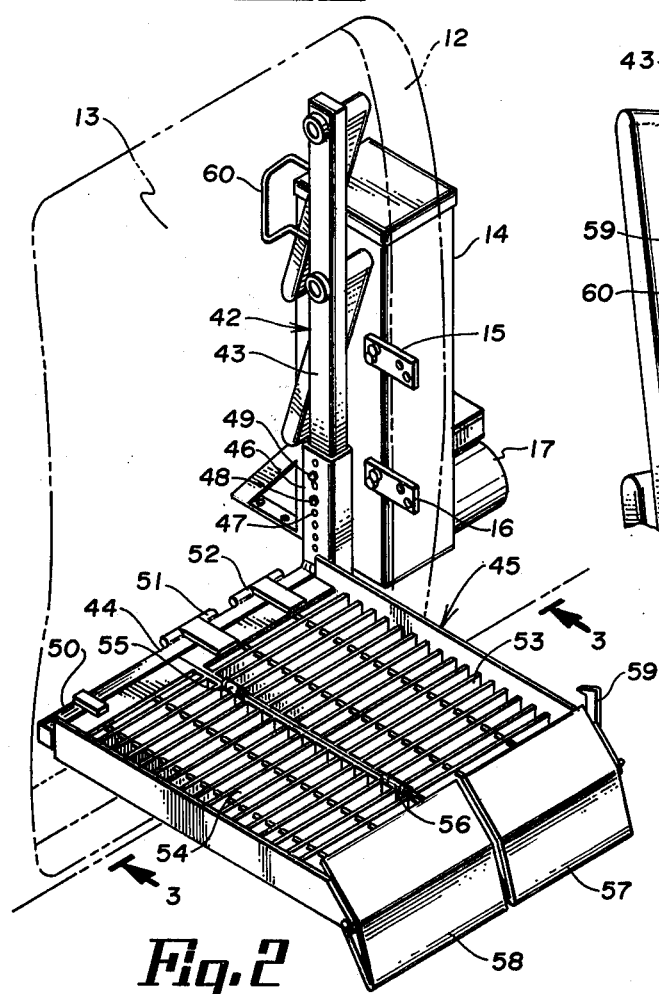
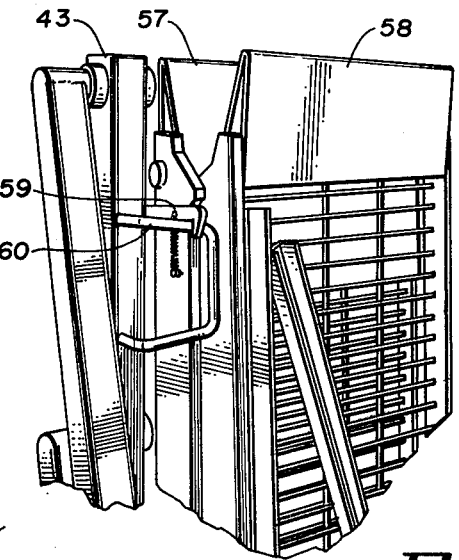
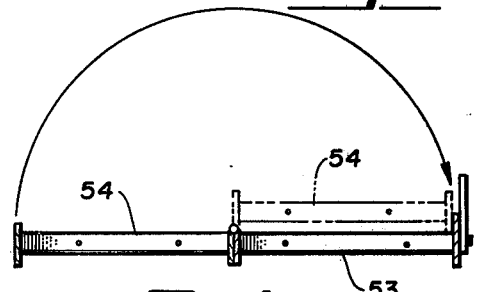
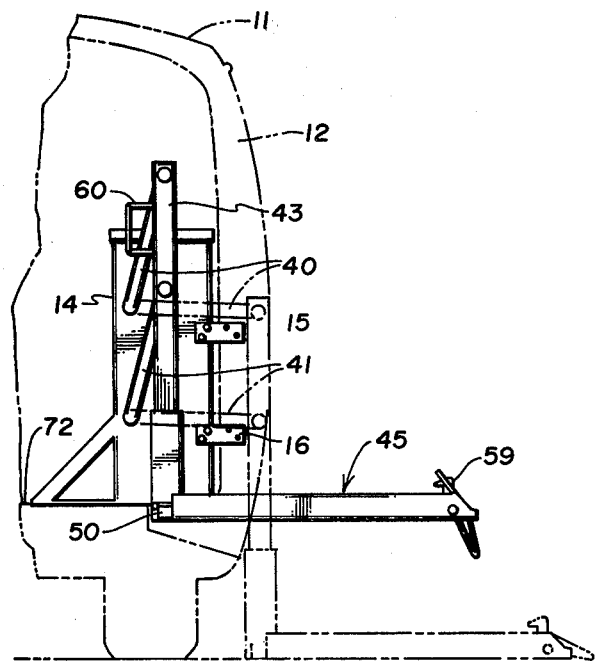
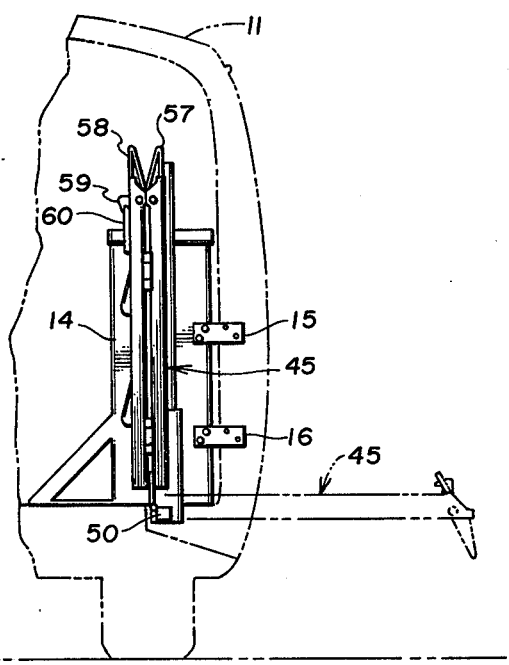

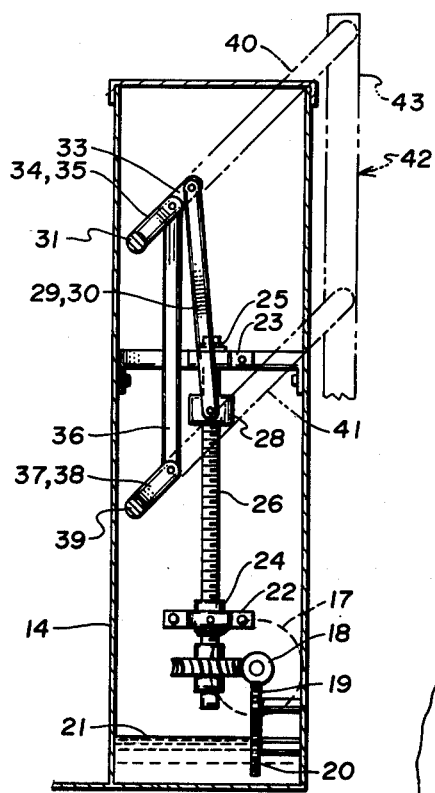
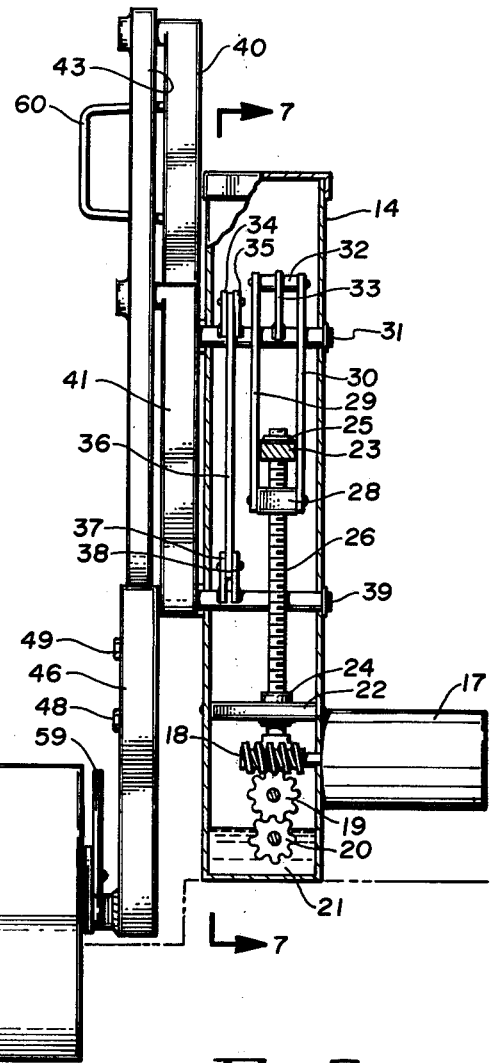
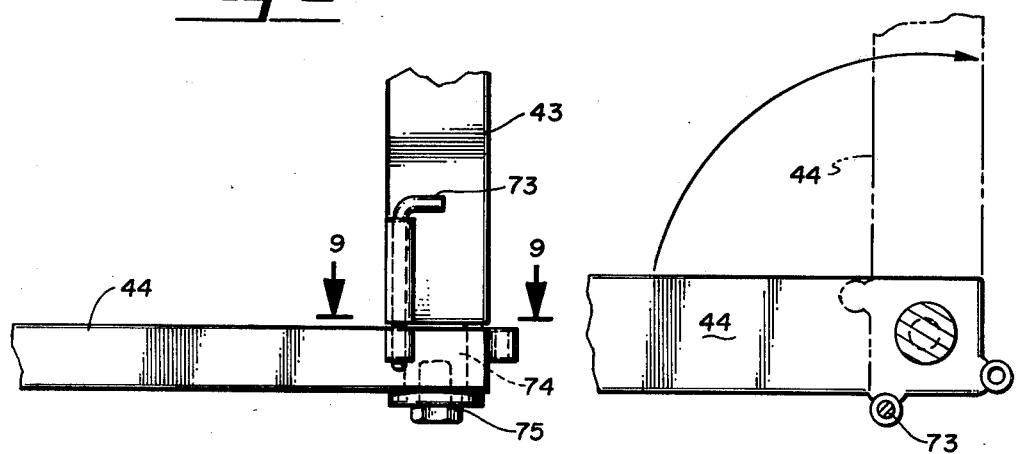

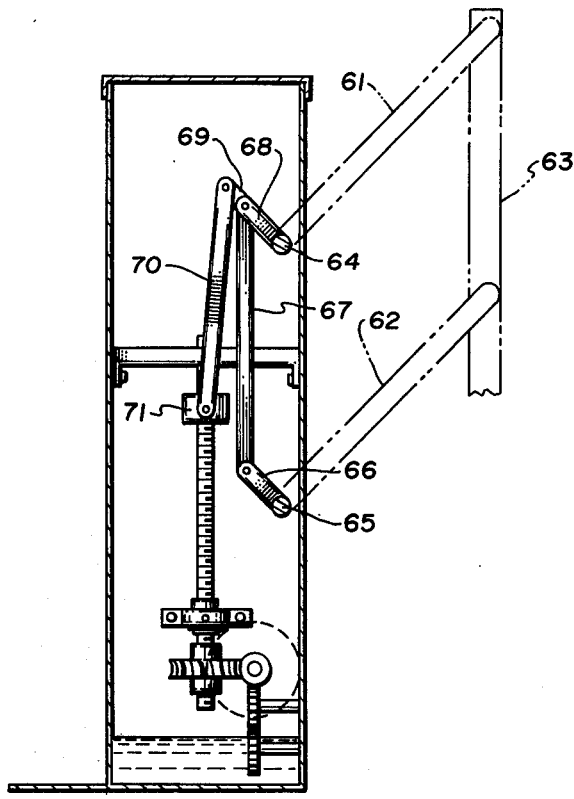

POWERED LOADING PLATFORM

This invention relates to a powered loading platform. More particularly, it relates to a powered loading platform designed to facilitate the loading of objects, such as wheelchairs, into a vehicle.

It is a general object of my invention to provide a novel and improved powered loading platform of simple, efficient and inexpensive design which will readily store within the confines of the vehicle.

A more specific object is to provide a novel and improved powered loading platform which can be readily mounted upon the opening-defining walls of a vehicle and can be readily stored when not in use in an out-of-way position entirely within the confines of the vehicle.

Another object is to provide a novel and improved powered loading platform having maximum safety features, operating efficiency, and storability.

Another object is to provide a novel and improved powered loading platform having powering mechanism which is located in an entirely non-obstructing position relative to the opening of the vehicle in which it is to be mounted.

Another object is to provide a novel and improved powered loading platform which is collapsible into minimum compass and swingable to a non-obstructing position after the loading operation has been accomplished.

Another object is to provide a novel and improved powered loading platform which is adjustable to increase its adaptability for situations where the object to be loaded may be on a level different from that upon which the vehicle is standing.

Another object is to provide a novel and improved powered loading platform which ensures that the platform remains horizontal at all times during the loading operation.

These and other objects and advantages of my invention will more fully appear from the following description, made in connection with the accompanying drawings, wherein like reference characters refer to the same or similar parts throughout the several views, in which:

FIG. 1 is a perspective view of one embodiment of my invention with the opening-defining walls of the vehicle shown in phantom broken lines;

FIG. 2 is a side elevational view of the embodiment of FIG. 1 with the platform extended in elevated and extended position and a portion of the vehicle shown in phantom in broken lines;

FIG. 3 is a vertical sectional view taken along line 3—3 of FIG. 1;

FIG. 4 is a side elevational view similar to FIG. 2, but with the platform shown in collapsed and retracted position within the confines of the vehicle;

FIG. 5 is a fragmentary perspective view on an enlarged scale showing the platform of FIG. 1 in collapsed, locked and retracted position, as viewed from the interior of the vehicle;

FIG. 6 is a fragmentary front elevational view on an enlarged scale of the same embodiment with the drive box thereof shown in vertical section;

FIG. 7 is a vertical sectional view taken along line 7—7 of FIG. 6;

FIG. 8 is a fragmentary detailed view on an enlarged scale showing the pivotal connection and locking pin of the platform support means with the lower end of the vertical leg which is carried by the powered parallelogram linkage;

FIG. 9 is a horizontal sectional view taken along line 9—9 of FIG. 8; and

FIG. 10 is a vertical sectional view taken similarily to that shown in FIG. 7, but of a second embodiment of the powered linkage mechanism.

FIGS. 1-9, inclusive, show one embodiment of my invention which, as indicated above, is designed for mounting within a vehicle 11 which has opening-defining side wall portions 12 defining an opening 13 in the body of the vehicle. My powered loading platform is designed to be mounted in such an opening so as to facilitate the loading of an object such as a wheelchair from the ground level to the interior of the vehicle. To accomplish this, I have provided a drive box 14 which is mounted upon the side wall portions 12 by a pair of mounting plates 15 and 16, as shown in FIG. 1, so that the entire drive box is disposed within the confines of the body of the vehicle laterally of the opening-defining wall portions 12. A power source, such as an electric motor 17, is mounted on the lower portion of the drive box 14 and carries a worm gear 18 at the end of its output shaft, as shown in FIGS. 6 and 7. As shown in these figures, the worm gear 18 drives a pair of oiler gears 19 and 20 which are rotatably mounted in one of the side walls of the drive box 14, the lower gear 20 extending into an oil bath 21 whereby oil is transferred to the surface of the teeth of gear 19 as it rotates and it in turn transfer oil to the worm gear 18 for lubrication purposes.

Mounted within the gear box 14 is a pair of vertically spaced mounting brackets or plates 22 and 23. A thrust bearing 24 is carried by plate 22 and a second thrust bearing 25 is carried by mounting plate 23. Within these bearings, a screw 26 is rotatably mounted. The screw 26 is driven by gear 27 fixedly connected to the lower end thereof and in turn driven by worm gear 18.

Carried by the threaded portion of the screw 26 is a screw ball or nut 28 which is connected at its opposite sides by a pair of thrust arms 29 and 30 to a pivot shaft 31 by means of a transverse pin 32 and a lever arm 33, which is fixedly connected to the pivot shaft 31 and rotatably connected to said pin.

Also carried by the pivot shaft 31 is a pair of ears 34 and 35 which are pivotally connected to a link 36 which extends downwardly and is pivotally connected to a similar pair of ears 37, 38 fixedly mounted upon a second pivot shaft 39. It will be appreciated that each of the pivot shafts 31 and 39 are rotatably mounted in opposite side walls of the drive box 14.

Fixedly connected to the outer end of the pivot shaft 31 outside of the drive box 14 and rotating therewith is a pivot arm 40. Fixedly connected to the outer end of the pivot shaft 39 is a second pivot arm 41 which extends parallel to the arm 40. Each of these pivot arms 40 and 41 are rotatably connected to the upper end portion of an L-shaped support indicated generally by the numeral 42. The axis of pivot of each of these pivot arms is spaced vertically on the L-shaped support 42 a distance equal to the vertical spacing between the axes of pivot of the pivot shafts 31 and 39, and each of the pivot arms 40 and 41 are of equal length so that together they constitute a parallelogram linkage supporting and driving or lifting the L-shaped support 42.

The L-shaped support 42 is comprised of a vertical leg 43 and a horizontal leg 44, the latter of which constitutes support means for a loading platform indicated generally by the numeral 45. The end of the horizontal leg 44 adjacent the drive box 42 is provided with an upstanding sleeve element 46 which telescopically receives the lower end of the vertical leg 43 therewithin. As best seen in FIG. 1, the sleeve element 46 is provided with a plurality of vertically spaced holes 47 and the lower end portion of the leg 43 is provided with a corresponding plurality of holes (not shown) extending therethrough. A pair of bolts 48 and 49 secure the sleeve element and the lower end portion of the leg 43 in fixed relation and, of course, provide means whereby the effective length of the vertical leg 43 may be adjusted as desired.

The horizontal leg 44 has a surface indicated by the numeral 50 which faces the inside of the body of the vehicle 11. A pair of hinges 51 and 52 is mounted on this surface 50, as shown in FIG. 1, so that the axis of pivot thereof is disposed inwardly of said surface. Hinge plates of said hinges are each fixedly connected to the inner end of one section 53 of the platform 45. As shown in FIG. 2, the platform 45 is comprised of a pair of platform grates 53 and 54, which extend parallel to each other and are interconnected by a second pair of hinges 55 and 56 which extend transversely to the longitudinal axis of the vehicle 11. As a result of said hinges 55 and 56, the grate 54 may be swung upwardly to a superimposed position relative to the grate 53, as shown in FIG. 4. FIG. 3 also illustrates the manner in which the platform grate 54 may be swung to superimposed position with respect to the grate 53.

Mounted on the outer end of the platform grate 53 is a pivoted ramp member 57. A similar ramp 58 is pivotally mounted on the outer end of the platform grate 54. These ramps are slightly inclined to facilitate movement of a vehicle such as a wheelchair upon the grates 53 and 54 preparatory to elevating the same to facilitate loading thereof into the vehicle.

Carried at the outer end of the platform grating 53 is a spring biased latch member 59 which is adapted, when the platform gratings 53 and 54 are collapsed, as shown in FIGS. 3 and 5, to engage a handle or gripping member 60 which is fixedly mounted upon the upper end of the vertical leg 43 and positioned so that the latch member 59 will engage the same when swung to the position shown in FIG. 5.

FIG. 10 shows a second embodiment of my invention which is similar to that portion of the invention shown in FIG. 7 with the exception that the axes of pivot of the pivot arms are located farther outwardly, toward the exterior of the vehicle, upon the drive box. As shown, the pivot arms 61 and 62 support the vertical leg 63 and rotate with the shafts 64 and 65 to provide parallelogram linkage for the vertical leg 63 supporting the platform (not shown). The axes of the pivot shafts 64 and 65 are vertically spaced a distance equal to the vertical spacing of the axes of pivot at which the arms 61 and 62 are connected to the vertical leg 63. A lever arm 66 fixedly mounted on the shaft 65 is pivotally connected to the link 67 which is pivotally connected at its upper end to a pair of ears, one of which is indicated by the numeral 68, and which are fixedly mounted on the shaft 64 for rotation therewith. The shaft 64 carries a lever arm 69 which is pivotally connected to one of a pair of thrust arms, one of which is indicated by the numeral 70, and which is pivotally connected at its lower end to the screw ball or nut 71. The remaining elements of this embodiment are all identical to those shown in FIGS. 1-9.

In operation, the reversible motor 17 is operated so as to cause the parallelogram linkage to move the platform support 44 between an elevated position within the confines of the vehicle 11, shown in FIG. 2, to the broken line position shown in that figure, at which the platform rests upon the ground. This movement is accomplished by the parallelogram linkage shifting from the position shown in FIGS. 1 and 2 to that shown in broken lines in the latter figure. In so doing, the outer ends of the pivot arms 40 and 41 swing outwardly and downwardly and thereby cause the horizontal leg 44 to move in an arc outwardly and downwardly so as to clear the opening-defining portions of the body of the vehicle 11 and move downwardly until the pivot arms 40 and 41 are approximately horizontal. Wheen the parallelogram linkage is so disposed, the platform 45 will normally rest upon the ground. In the event that there is eneven terrain so that the ground beneath the platform 45 is not at the same level as the surface upon which the vehicle is standing, adjustments may be made by shifting the position of the vertical leg 43 within the sleeve element 46 after removing the bolts 48 and 49. In this manner, the lower level of movement of the platform 45 can be readily adjusted as desired.

In use, the object to be loaded, such as a wheelchair, is rolled over the ramps 57 and 58 on to the platform 45 and the occupant of the wheelchair may grasp the gripping handle 60 for steadying same. When the motor 17 is operated in the proper direction, the platform will be swung upwardly to the full line position shown in FIG. 2, such that the horizontal leg 44 is disposed well within the outer confines of the opening-defining wall portions 12 of the vehicle 11. It will be noted that at this position, the upper surface of the platform 45 is level with the floor 72 of the vehicle so that the wheelchair may be readily rolled into the interior of the vehicle without difficulty. When the wheelchair has been moved to an out-of-way position within the vehicle, the platform grating 54 may be swung to the position shown in FIG. 3 and the two gratings can be then swung in collapsed position upwardly to the position shown in FIG. 5, at which position the latch 59 will automatically engage the gripping member 60 to lock the platform in vertically extending collapsed position. If desired, ready access to the interior of the vehicle 11 can be further facilitated by swinging the collapsed platform 45 to a transversely extending position relative to the longitudinal axis of the vehicle by releasing retaining pin 73, which locks the horizontal leg 44 against pivotal movement thereof relative to the vertical leg 43 which would otherwise be possible as a result of the pivotal connection between the lower end of the vertical leg and the horizontal leg, as shown in FIG. 8. FIG. 8 shows that the end of the horizontal leg 44 is pivotally connected by means of a pin 74 carried by the lower end of the vertical leg 43 which is received within an opening provided for that purpose in the end portion of the horizontal leg 44 and is secured therein by means of threaded member 75.

It will be noted that the drive box 14 and the motor 17 are both mounted laterally of the opening-defining portions of the vehicle 11 and that the motivating mechanism of the platform 45 is disposed immediately therealongside so as to provide maximum accessibility to the interior of the vehicle, particularly when the platform 45 is collapsed, as shown in FIG. 5, and/or is swung inwardly about the axis of pivot of the pin 74.

It will be seen that the powering mechanism for the parallel linkage shown herein is highly similar to and essentially the equivalent of that shown in U.S. Pat. No. 3,415,395, issued to W. A. Bishman on December 10, 1968.

It will, of course, be understood that various changes may be made in the form, details, arrangement and proportions of the parts without departing from the scope of my invention which consists of the matter shown and described herein and set forth in the appended claims.

I claim:
1. A powered platform comprising:
   (a) a vehicle having a body with a floor therein and having side wall portions defining an opening therein;
   (b) a drive box mounted on said side wall portions of said body inwardly thereof and laterally of the opening defined thereby;
   (c) gear mechanism carried by said drive box;
   (d) power means drivably connected to said gear mechanism for driving the same;
   (e) movement-producing linkage mounted on said drive box and connected at one of its ends to said gear mechanism in driven relation;
   (f) an L-shaped support pivotally connected in driven relation to said linkage at its other end;
   (g) said support having a generally horizontally extending leg and an upright leg extending upwardly therefrom, the latter of which is connected to said linkage in movement-producing relation of said support;
   (h) said linkage including a pivot member drivably connected to said gear mechanism and about which said linkage pivots, said linkage being constructed and arranged, when actuated by said gear mechanism through said pivot member, to move said horizontal leg of said support outwardly of said vehicle body in an arc from an elevated position within the confines of said vehicle body adjacent its floor to a lower horizontally extending position adjacent the ground; and
   (i) a loading platform pivotally mounted on said horizontal leg of said support and movable therewith and being swingable relative thereto when said support is disposed within the confines of said vehicle body between an outwardly extending generally horizontal position and an upright generally vertically extending inward position relative to the confines of said vehicle body.

2. The structure defined in claim 1 wherein said power means is disposed entirely in a position lateral of the opening defined by said body side wall portions.

3. The structure defined in claim 1 wherein said horizontal leg of said support is pivotally mounted on said vertical leg and is pivotable relative thereto about a vertical axis between parallel and normally extending positions relative to the longitudinal axis of said vehicle.

4. The structure defined in claim 1 wherein said linkage includes parallelogram linkage supporting said L-shaped support and connecting the same with said power means.

5. The structure defined in claim 1 wherein said loading platform is comprised of a plurality of parallel sections pivotally connected to each other at their sides and pivotable about an axis extending transversely of said vehicle into superimposed relation with each other.

6. The structure defined in claim 1 and
   (j) a gripping handle carried by said vertical leg adjacent its upper end, and
   (k) latch means carried by said platform and positioned to positively and cooperatively engage said handle when said platform is swung upwardly to approximately vertically extending position to secure said platform in said position.

7. The structure defined in claim 1 wherein said linkage includes a parallelogram linkage supporting said L-shaped support and connecting same with said power means, said parallelogram linkage including a pair of vertically spaced shafts rotatably mounted on said drive box and rotatably driven by said gear mechanism, one each of a pair of parallel pivot arms of equal length fixedly connected to each of said driven shafts and extending outwardly therefrom and rotating therewith, said pivot arms being each pivotally connected to said vertical leg of said L-shaped support at vertically spaced points located so that said horizontal leg of said L-shaped support is moved outwardly and downwardly to a position adjacent the ground and outwardly of the confines of said vehicle body when said pivot arms are swung outwardly and downwardly by said driven shafts to a position approximating horizontal and said horizontal leg is disposed adjacent the floor of and well within the confines of said vehicle when said pivot arms are moved to positions approaching vertical, whereby a vehicle such as a wheelchair may be readily and easily rolled onto said platform and elevated from ground level to floor level of said vehicle and then moved into the interior thereof.

8. The structure defined in claim 1, wherein one of said legs of said L-shaped support has a sleeve element at one of its ends which telescopically receives the other of said legs therein and connects the two, said sleeve element and said end of said other leg received therein each being adapted for adjustable interconnection whereby the effective length of said vertically extending leg may be adjusted as desired.

9. The structure defined in claim 1 wherein said horizontally extending leg of said L-shaped support includes an upstanding sleeve element at one of its ends and the lower end of said vertically extending leg is telescopically received therein, said sleeve element and said lower end of said vertically extending leg each having cooperative interengaging means at their said respective telescoping ends whereby the effective length of said vertically extending leg may be adjusted, as desired.

10. The structure defined in claim 1 wherein said horizontally extending leg of said L-shaped support has a surface facing the interior of said vehicle body, and
   (j) hinge means mounted on said horizontally extending leg of said L-shaped support and pivotally mounting said loading platform thereon with the axis of pivot of said hinge means being disposed inwardly of said surface and extending generally parallel to the longitudinal axis of said vehicle whereby said platform may be swung inwardly and upwardly from an approximately horizontal position to an upright position within the confines of said vehicle body.

11. A powered loading platform comprising:
   (a) a drive box adapted to be rigidly mounted upon and inwardly of opening-defining walls of a vehicle;
   (b) gear mechanism carried by said drive box;

(c) power means drivably connected to said gear mechanism for driving the same;

(d) a loading platform;

(e) support means pivotally connected to said platform in supporting relation for swinging movement of said platform between an approximately horizontally extending position and an approximately vertically extending position; and (f) linkage mechanism extending between said support means and said gear mechanism and being driven by a pivot member about the axis of which it pivots, said pivot member being connected to said gear mechanism in pivotally driven relation, said linkage mechanism being constructed and arranged to move said support means and said horizontal platform in supported relation outwardly in an arc from an elevated position adjacent to said gear mechanism to a lower, non-adjacent, outwardly disposed position.

12. The structure defined in claim 11 wherein said support means is also pivotally mounted for swinging movement about a vertical axis.

13. A powered loading platform comprising:

(a) a vehicle having a body with a floor and opening-defining wall portions;

(b) gear mechanism carried by said vehicle body and rotatably mounted adjacent said opening-defining wall portions;

(c) power means connected to said gear mechanism in driving relation;

(d) pivotal support means;

(e) a loading platform pivotally mounted on said support means and movable therewith in supported relation and being movable about its axis of pivot between an outwardly extending approximately horizontal position to an approximately vertically extending position;

(f) power-transmitting linkage pivotally mounted adjacent said opening-defining wall portions of said body and including a pivot member about which it pivots connected to said gear mechanism in pivotally driven relation and connected to said support means in pivotal supporting and moving relation;

(g) said linkage being constructed and arranged to move said support means vertically along an arc between a lowered approximately ground-engaging position outside said vehicle body and an elevated position within the confines of said vehicle body whereby said loading platform may be elevated from an approximately ground-engaging level to floor level of said vehicle to facilitate loading of a vehicle such as a wheelchair through the opening defined by said portions and thereafter permit said platform to be swung upwardly to an approximately vertically extending position entirely within the confines of said vehicle body.

14. The structure defined in claim 13 wherein said gear mechanism and said power means are each disposed laterally of the opening defined by said opening-defining wall portions.

15. The structure defined in claim 13 wherein said pivotal support means is pivotable about a vertical axis whereby said platform when in said vertically extending position may be swung to an out-of-way transversely extending position relative to the longitudinal axis of said vehicle.

16. A powered loading platform comprising:

(a) a vehicle having a body with side wall portions defining an opening therein;

(b) a loading platform;

(c) platform support means connected to said loading platform and pivotally supporting the same for pivotal movement of said platform between an outwardly generally horizontally extending position relative to said vehicle and a generally vertically extending position;

(d) the axis of said pivotal movement of said platform being disposed within the confines of said vehicle body during said pivotal movement to permit said platform to be readily confined within the confines of said vehicle while in said generally vertically extending position;

(e) parallelogram linkage pivotally connected to said platform support means in supporting relation at vertically spaced axes of pivot;

(f) linkage support means carried by said vehicle body and pivotally supporting said parallelogram linkage for pivotal movement about vertically spaced axes of pivot disposed within the confines of said vehicle body; and (g) powered linkage pivoting mechanism including a rotatably driven pivot member connected to said parallelogram linkage in actuating relation and constructed and arranged to cause said parallelogram linkage to pivot thereabout and thereby move said platform support between a position disposed within the confines of said vehicle body adjacent its said floor and a position adjacent the ground and exterior of the confines of said body.

17. A powered loading platform comprising:

(a) a loading platform;

(b) an L-shaped platform support connected in supporting relation to said platform;

(c) said support having a generally horizontally extending leg and an upright leg extending upwardly therefrom, the former of which is pivotally connected to said platform in supporting relation;

(d) parallelogram linkage pivotally connected at one of its sides to said upright leg in supporting relation at vertically spaced axes of pivot, (e) linkage support means pivotally supporting said parallelogram linkage at its opposite side for pivotal movement about equally vertically spaced axes of pivot, and (f) powered linkage-pivoting mechanism including a pivot member driven for pivotal movement about its axis connected to said parallelogram linkage in actuating relation and constructed and arranged to cause said parallelogram linkage to pivot thereabout and to move said horizontal leg of said platform support along an arcuate path between an elevated position adjacent said linkage supporting means to a more outwardly and remotely located lower position.

18. The structure defined in claim 17 wherein said horizontally extending leg of said L-shaped support is pivotable relative to said vertically extending leg about a vertical axis.

19. The structure defined in claim 17 wherein said platform is pivotable relative to said horizontally extending leg between a horizontally and outwardly extending position and an inwardly disposed generally vertically extending position.

20. The structure defined in claim 17 wherein said powered linkage-pivoting mechanism is disposed entirely laterally of said L-shaped support and of said loading platform.

* * * * *

UNITED STATES PATENT AND TRADEMARK OFFICE
CERTIFICATE OF CORRECTION

PATENT NO. : 4,140,230
DATED : February 20, 1979
INVENTOR(S) : Marvin R. Pearson It is certified that error appears in the above-identified patent and that said Letters Patent are hereby corrected as shown below:

Column 4, line 16, delete "Wheen" and insert - When -

" line 19, delete "eneven" and insert - uneven -

Signed and Sealed this

Fifth Day of June 1979

[SEAL]

Attest:

RUTH C. MASON
Attesting Officer

DONALD W. BANNER
Commissioner of Patents and Trademarks